(12) United States Patent
Ohe et al.

(10) Patent No.: US 7,266,305 B2
(45) Date of Patent: Sep. 4, 2007

(54) OPTICAL COMMUNICATION MODULE, MANUFACTURING METHOD THEREOF, AND ELECTRONIC APPARATUS

(75) Inventors: Nobuyuki Ohe, Nara-ken (JP); Kazuhito Nagura, Kashihara (JP); Motoki Sone, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 737 days.

(21) Appl. No.: 10/458,659

(22) Filed: Jun. 11, 2003

(65) Prior Publication Data
US 2003/0235414 A1 Dec. 25, 2003

(30) Foreign Application Priority Data
Jun. 25, 2002 (JP) ............................. 2002-184918

(51) Int. Cl.
*H04B 10/00* (2006.01)
*H04B 10/12* (2006.01)

(52) U.S. Cl. .................. 398/164; 398/141; 398/138; 398/139

(58) Field of Classification Search ................ 398/164, 398/141, 128, 130, 135, 138, 139
See application file for complete search history.

(56) References Cited

U.S. PATENT DOCUMENTS 5,909,298 A * 6/1999 Shimada et al. ............ 398/164
6,031,278 A * 2/2000 Onoda et al. ................ 257/679
6,179,624 B1 1/2001 McHugh et al.

FOREIGN PATENT DOCUMENTS

| CN | 1295360 A | 5/2001 |
|----|-----------|--------|
| JP | 2000-347074 A | 12/2000 |
| JP | 2001-116958 A | 4/2001 |

* cited by examiner

*Primary Examiner*—M. R. Sedighian
(74) *Attorney, Agent, or Firm*—Birch, Stewart, Kolasch & Birch, LLP

(57) ABSTRACT

The present invention is composed of a mainframe 2 having a holder portion 2a for detachably holding an optical plug provided on an optical fiber end portion. An input/output board 6 is disposed on the lower side of the mainframe 2, and on the lower face of the input/output board 6, there is provided an electrode portion enabling electric connection by contact pressure. On the lower side of the mainframe 2, there are provided support portions 12, 13 and a peripheral portion 9 protruding downward from the lower face of the input/output board 6, and with use of a screw hole 7 provided on the side of the holder portion 2a of the mainframe 2, the mainframe 2 is fixed to a mounting board 21 with a screw 31.

20 Claims, 13 Drawing Sheets

Fig.21 PROIR ART
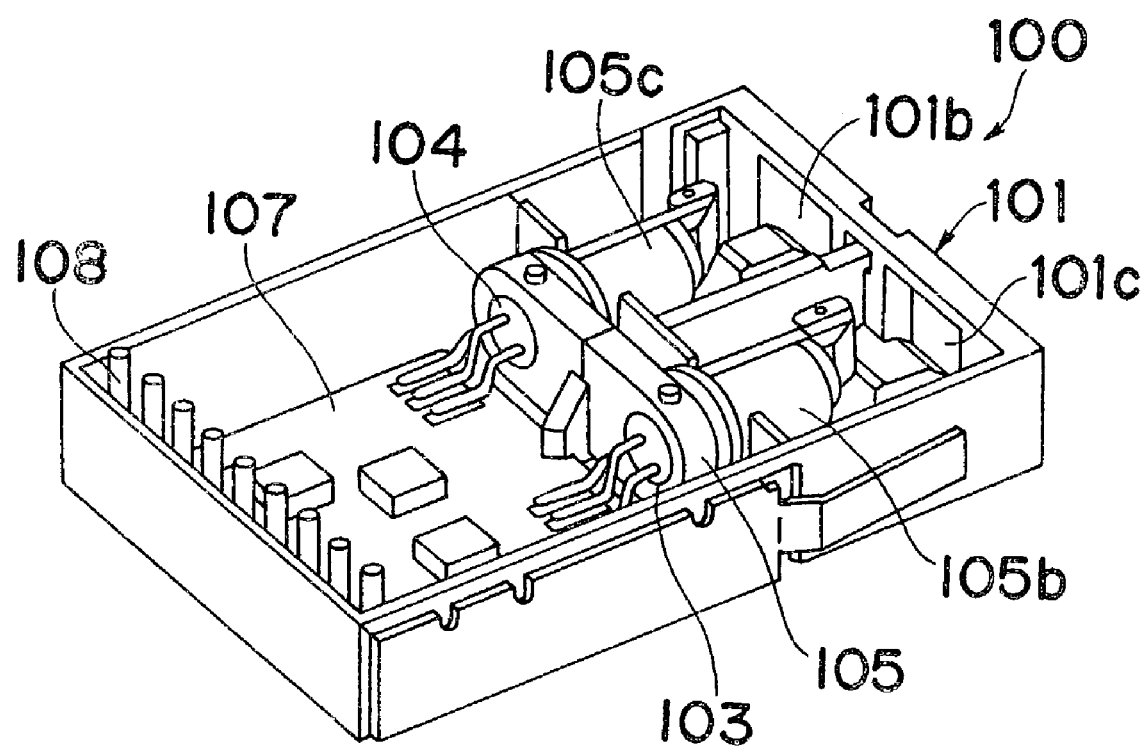

OPTICAL COMMUNICATION MODULE, MANUFACTURING METHOD THEREOF, AND ELECTRONIC APPARATUS

BACKGROUND OF THE INVENTION

The present invention relates to an optical communication module, a mounting method thereof and an electronic apparatus, and more particularly relates to an optical communication module for use in system for transmitting signals with use of optical fibers, particularly in digital communication system enabling high-speed transmission such as IEEE (Institute of Electrical and Electronics Engineers) 1394 and USB (Universal Serial Bus) 2, a mounting method thereof, and an electronic apparatus.

As a conventional first optical communication module, there is one disclosed in Japanese Patent Laid-Open Publication No. 2000-34707. This optical communication module includes, as shown in FIG. 21, a ferrule holder 105 having a reception ferrule holder 105b and a transmission ferrule holder 105c formed integrally. The reception ferrule holder 105b secures an optical plug (unshown), which is to be inserted into an optical plug detachable port 101c, to a specified position for establishing optical connection to a light emitting device assembly. Also, the transmission ferrule holder 105c secures an optical plug (unshown), which is to be inserted into an optical plug detachable port 101b, to a specified position for establishing optical connection to a light receiving device assembly. In FIG. 21, there are shown: an electric circuit board 107 on which a driving electric circuit for transmission and an electric circuit for reception are mounted; a casing 101; a light receiving device 103; a light emitting device 104; and an electric connection pin 108 as a means for electrically connecting an electric circuit mounted on the electric circuit board 107 to an external electric circuit.

As a conventional second optical communication module, there is one for use in communication system employing ATM (Asynchronous Transfer Mode) and IEEE1394b. FIG. 22A is a top view showing the optical communication module, while FIG. 22B is a side view showing the optical communication module. In FIGS. 22A and 22B, a mold-packaged light emitting device 203 and a light receiving device 204 are mounted on a holder 202 in which a transmission connector and a reception connector enabling attachment and detachment of an optical plug 201 are formed integrally. The holder 202 is disposed on an electric circuit board 207 on which there are mounted an integrated circuit portion 205 for driving the light emitting device and an integrated circuit portion 206 for processing signal from the light receiving device. In FIGS. 22A and 22B, reference numeral 208 denotes a connection terminal as a means for electrically connecting an electric circuit mounted on the electric circuit board 207 to an external electric circuit.

Also, as a conventional third optical communication module, there is one disclosed in Japanese Patent Laid-Open Publication No. 2001-116958. In the optical communication module, as shown in FIG. 23, an optical module mainframe 303 is provided with a receptacle portion 302 that enables attachment and detachment of an optical connector 301. Also, on the lower side of the optical module mainframe 303, there is provided an electric terminal 304 allowing the mainframe to be mounted on a mounting board 306. The electric terminal 304 is disposed so as to correspond to a land 308 of the mounting board 306. Further, on the lower side of the optical module mainframe 303, there is provided a stud portion 305. On the mounting board 306, there is formed a fixing hole 307 engaging with the stud portion 305, and by the stud portion 305, the optical module mainframe 303 is positioned on the mounting board 306. In this optical communication module structure, after the stud portion 305 of the optical module mainframe 303 is engaged with the fixing hole 307 of the mounting board 306, solder between the electric terminal 304 and the land 308 is melted so that the optical module mainframe 303 is reflow-mounted on the mounting board 306.

In the above first and second optical communication modules, electric connection to a mounting board is achieved by inserting an input/output terminal provided on the optical communication module into a through hole provided on the mounting board, and conducting soldering or solder-flowing. Also, in the third optical communication module, electric connection is achieved by providing the mounting board 306 with the land 308 in a position corresponding to the position of the electric terminal 304 of the optical communication module, and melting the solder between the electric terminal 304 and the land 308 by reflowing.

In each of the above first to third optical communication modules, electric connection is achieved through melting of the solder, which requires a heat processing step to melt solder in the process of soldering, flowing and reflowing. The heat processing causes a problem that the thermal stress is applied to internal optical devices and electric circuits such as optical device driving circuits and signal processing circuits in the optical communication module, thereby causing damages and failure. Further, in a soldering step with use of a soldering-gun, there is the possibility that in the soldering operation, static electrical charges cause destruction of the internal optical devices and the electric circuits such as optical device driving circuits and signal processing circuits, which requires some measure to prevent electrostatic destruction, and therefore makes smooth establishment of electric connection difficult.

Also in the case of the second optical communication module, when the optical communication module is mounted on the board, mechanical connection and electric connection are established only by soldering the connection terminal 208 as an input/output electric terminal and as a fixing terminal. Consequently, stress generated in attaching and detaching the optical plug 201 is imposed on the connection terminal 208, so that a failure due to imperfect contact of a soldered portion may occur. Further in the case of the first and third optical communication modules, stress generated in attaching and detaching the optical plug tends to be directly imposed on the soldered terminal, thereby causing a failure due to imperfect contact of the soldered portion.

Further in recent years, use of laser diode as an internal light emitting device of optical communication modules is frequent, and so it is considered that the products incorporating the optical communication module may suffer failure of the optical communication module relating to the life of the laser diode. In the case of the above-stated conventional first to third optical communication modules, electric connection is established by soldering. Consequently, when failure of the optical communication module occurs and replacement of the optical communication module is required, re-melting of solder is necessary, which makes the replacement operation difficult. Also, in the step of re-melting the solder, thermal stress is also posed on peripheral circuits, which may cause failure of those peripheral circuits.

SUMMARY OF THE INVENTION

Accordingly, it is an object of the present invention to provide an optical communication module capable of preventing generation of thermal stress and electrostatic destruction in mounting process, reducing stress to an input/output terminal in attaching and detaching an optical plug and enabling easy replacement, and to provide a manufacturing method thereof, and an electronic apparatus.

In order to achieve the above object, there is provided an optical communication module having at least either one of a light emitting device for emitting transmission light signal and a light receiving device for receiving reception light signal and performing communication with use of at least either one of the transmission light signal and the reception light signal through an optical fiber, comprising:

a mainframe having a holder portion for detachably holding an optical plug provided on an end portion of the optical fiber;

an external connection board disposed on a lower side of the mainframe;

an electrode portion provided on a lower side of the external connection board for enabling electric connection by contact pressure; and a support portion provided on a lower side of the mainframe and protruding downward from a lower face of the external connection board.

According to the above structured optical communication module, in mounting the mainframe on a mounting board, the lower end of the support portion provided on the lower face of the mainframe is brought into contact with a mounting face of the mounting board so that the mainframe is not inclined with respect to the mounting board, and a space is formed between the lower face of the external connection board on which the electrode portion is provided and the mounting board. In the space, there can be housed, for example, a connector having a connection terminal with elasticity mounted on the mounting board. Such connection terminal of the connector mounted on the mounting board is electrically connected to the electrode portion of the external connection board by contact pressure. This makes it possible to prevent generation of thermal stress and electrostatic destruction in the mounting process. Force applied to the holder portion of the mainframe when the optical plug is attached or detached acts upon the mounting board through the support portion provided on the lower face of the mainframe, which makes it possible to restrain the stress imposed on input/output terminals (including the electrode portion of the external connection board and the connection terminal of the connecter on the side of the mounting board). Even if force is applied to the input/output terminal, the electric connection, which is obtained not by soldering but by contact pressure, may let the force escape through the contact portion, thereby providing increased reliability of the electric connection. Further, establishing the electric connection not by use of solder but by contact pressure makes it possible to fulfill an optical communication module which is structured to facilitate unfixing from the mounting board so as to enable easy replacement.

Also, there is provided an optical communication module having at least either one of a light emitting device for emitting transmission light signal and a light receiving device for receiving reception light signal and performing communication with use of at least either one of the transmission light signal and the reception light signal through an optical fiber, comprising:

a mainframe having a holder portion for detachably holding an optical plug provided on an end portion of the optical fiber;

an external connection board disposed on a lower side of the mainframe;

a connector provided on a lower face side of the external connection board and having an elastic connection terminal that enables electric connection by contact pressure; and a support portion provided on a lower side of the mainframe and protruding downward from a lower face of the external connection board.

According to the above structured optical communication module, in mounting the mainframe on a mounting board, the lower end of the support portion provided on the lower face of the mainframe is brought into contact with a mounting face of the mounting board so that the mainframe is not inclined with respect to the mounting board, and a space is formed between the lower face of the external connection board and the mounting board. In the space, there can be housed a connector. A connection terminal of the connector is electrically connected to, for example, an electrode portion mounted on the mounting board by contact pressure. This makes it possible to prevent generation of thermal stress and electrostatic destruction in the mounting process. Force applied to the holder portion of the mainframe when the optical plug is attached or detached acts upon the mounting board through the support portion provided on the lower face of the mainframe, which makes it possible to restrain the stress imposed on input/output terminals (including the connection terminal of the connector on the external connection board and the electrode portion on the side of the mounting board). Even if force is applied to the input/output terminal, the electric connection, which is obtained not by soldering but by contact pressure, makes it possible to fulfill an optical communication module which is structured to facilitate unfixing from the mounting board so as to enable easy replacement.

In one embodiment of the present invention, the optical communication module further comprises:

both the light emitting device and the light receiving device, a light emitting device-use electric circuit board for driving the light emitting device; and a light receiving device-use electric circuit board for processing a reception signal of the light receiving device, wherein the light emitting device-use electric circuit board and the light receiving device-use electric circuit board are disposed with a space therebetween in direction orthogonal to the external connection board.

According to the optical communication module of the above embodiment, a large distance may be obtained between the both electric circuit boards, which may provide electromagnetic separation between the both electric circuit boards, thereby fulfilling an optical communication module having high signal-to-noise ratio.

In one embodiment of the present invention, the optical communication module further comprises:

both the light emitting device and the light receiving device, wherein a light emitting device-use electric circuit board for driving the light emitting device and a light receiving device-use electric circuit board for processing a reception signal of the light receiving device are provided on the external connection board.

According to the optical communication module of the above embodiment, even the structure in which an electric circuit board for light emitting device for driving the light emitting device and an electric circuit board for light receiving device for processing a reception signal of the light receiving device are present on the external connection board makes it possible to prevent generation of thermal stress and electrostatic destruction in the mounting process, thereby fulfilling an optical communication module capable of restraining stress applied to the input/output terminal and easy replacement.

In one embodiment of the present invention, the electrode portion is electrically connected to a mounting board through a connector having an elastic connection terminal enabling electric connection by contact pressure, and a depth from a lower face of the external connection board to a lower end of the support portion is set equal to or larger than a height of a housing of the connector.

According to the optical communication module of the above embodiment, a depth from a lower face of the external connection board to a lower end of the support portion is set equal to or larger than a height of a housing of the connector, so that the connector can be housed in a space formed between the lower face of the external connection board and the mounting board. This makes it possible to dispose the connector on the lower side of the mainframe, to reduce the mounting area, and to decrease the height in the mounted state.

In one embodiment of the present invention, a depth from a lower face of the external connection board to a lower end of the support portion is set equal to or larger than a height of a housing of the connector.

According to the optical communication module of the above embodiment, a depth from a lower face of the external connection board to a lower-end of the support portion is set equal to or larger than a height of a housing of the connector, so that the connector can be housed in a space formed between the lower face of the external connection board provided with the electrode portion and the mounting board. This makes it possible to dispose the connector on the lower side of the mainframe, to reduce the mounting area, and to decrease the height in the mounted state.

In one embodiment of the present invention, the optical communication module further comprises:

fixing means provided on a side of the holder portion of the mainframe for fixing the mainframe to the mounting board.

According to the optical communication module of the above embodiment, the fixing means is provided on the holder portion side which receives force when attaching or detaching an optical plug, so that a mechanical strength is increased and therefore the stress applied to the input/output terminal may be further restrained.

In one embodiment of the present invention, the optical communication module further comprises:

fixing means provided on a side of the holder portion of the mainframe for fixing the mainframe to the mounting board; and at least one electrode row composed of a plurality of the arrayed electrode portions of the connector in a region of the external connection board positioned on a side opposite to an insertion hole of the holder portion of the mainframe along a direction approximately orthogonal to an insertion direction of the optical plug.

According to the optical communication module of the above embodiment, there is at least one electrode row composed of plural electrode portions on the semiconductor board on the side opposite to the holder portion of the mainframe equipped with the fixing means in the direction approximately orthogonal to the insertion direction of the optical plug. This makes it possible to shorten a distance from the fixing means to each electrode portion of the external connection board so as to decrease influence of force applied to the holder portion to each electrode portion when attaching the optical plug, thereby enabling increase of reliability of the electric connection.

In one embodiment of the present invention, the optical communication module further comprises:

fixing means provided on a side of the holder portion of the mainframe for fixing the mainframe to the mounting board; and at least one terminal row composed of a plurality of the arrayed connection terminals of the connector in a region of the external connection board positioned on a side opposite to an insertion hole of the holder portion of the mainframe along a direction approximately orthogonal to an insertion direction of the optical plug.

According to the optical communication module of the above embodiment, there is at least one terminal row composed of plural connection terminals of the connector arrayed on the side opposite to the holder portion of the mainframe equipped with the fixing means in the direction approximately orthogonal to the insertion direction of the optical plug. This makes it possible to shorten a distance from the fixing means to each connection terminal of the connector so as to decrease influence of force applied to the holder portion to each connection terminal when attaching the optical plug, thereby enabling increase of reliability of the electric connection.

In one embodiment of the present invention, the fixing means is a screw hole provided on a lower side of the main frame.

In one embodiment of the present invention, the fixing means is a screw provided on a lower side of the mainframe so as to protrude downward.

In one embodiment of the present invention, the fixing means is a weld-use protrusion provided on a lower side of the mainframe.

In one embodiment of the present invention, the optical communication module further comprises:

positioning means for positioning the mainframe with respect to the mounting board.

According to the optical communication module of the above embodiment, it becomes possible to ensure establishment of electric connection between the external connection board and the mounting board.

In one embodiment of the present invention, the positioning means is a positioning pin provided on a lower side of the mainframe.

According to the optical communication module of the above embodiment, providing, for example, a hole to be engaged with the positioning pin on the mounting board enables reliable positioning with simple structure.

Also, there is provided a mounting method of the optical communication module, comprising the step of electrically connecting an electrode portion provided on a lower face of the external connection board of the optical communication module to a connection terminal of a connector mounted on the mounting board by contact pressure.

According to the mounting method of the optical communication module, it becomes possible to provide a method for mounting an optical communication module capable of preventing generation of thermal stress and electrostatic destruction in mounting process, restraining stress applied to the input/output terminal, and facilitating replacement of the optical communication module because of the electric connection established not by solder but by contact pressure.

Also, there is provided a mounting method of an optical communication module, comprising the step of electrically connecting a connection terminal of a connector provided on a lower face side of the external connection board of the optical communication module to an electrode portion provided on the mounting board by contact pressure.

According to the mounting method of the optical communication module, it becomes possible to provide a method for mounting an optical communication module capable of preventing generation of thermal stress and electrostatic destruction in mounting process, restraining stress applied to the input/output terminal, and facilitating replacement of the optical communication module because of the electric connection established not by solder but by contact pressure.

In one embodiment of the present invention, the mounting method further comprises the step of:

with use of a screw hole as fixing means provided on a lower side of the mainframe of the optical communication module, fixing the optical communication module to the mounting board by screwing.

According to the mounting method of the optical communication module of the above embodiment, it becomes possible with simple structure to reliably attach the optical communication module to the mounting board and to easily detach the module from the mounting board.

In one embodiment of the present invention, the mounting method further comprises the step of:

welding a weld-use protrusion as fixing means provided on a lower side of a mainframe of the optical communication module to the mounting board for fixing the optical communication module to the mounting board.

According to the mounting method of the optical communication module of the above embodiment, it becomes possible with simple structure to reliably attach the optical communication module to the mounting board and to easily detach the module from the mounting board.

Also, there is provided an electronic apparatus incorporating the above optical communication module.

According to the electronic apparatus, it becomes possible to provide an electronic apparatus capable of preventing generation of thermal stress and electrostatic destruction in mounting process of the optical communication module, restraining stress applied to the input/output terminal, and facilitating replacement of the optical communication module because of the electric connection established not by solder but by contact pressure.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 21 is a perspective view showing a first conventional optical communication module;

FIG. 22A is a plane view showing a second conventional optical communication module, while

DETAILED DESCRIPTION OF THE PREFERRED EMBODIMENTS

Hereinbelow, detailed description will be given of an optical communication module of the present invention, a mounting method thereof and an electronic apparatus in conjunction with embodiments with reference to the drawings.

First Embodiment

Figure 1:
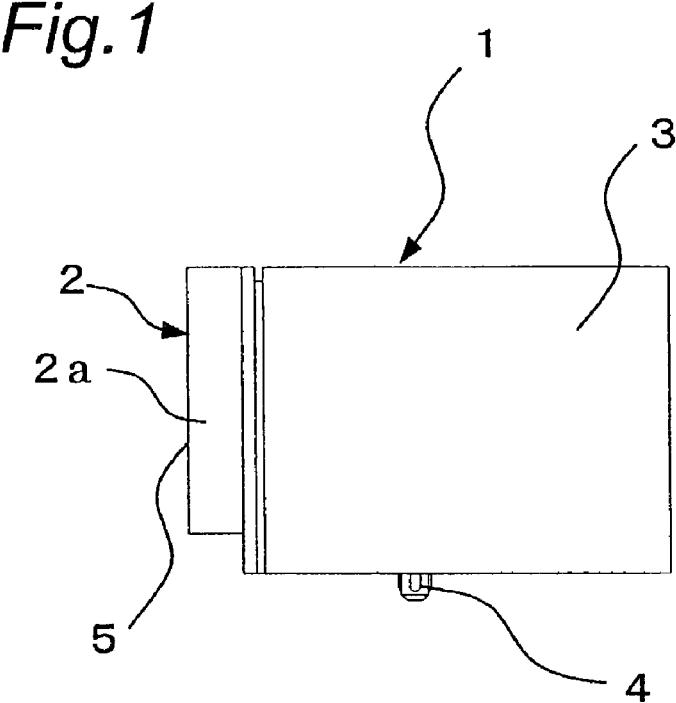
FIG. 1 is a side view showing an optical communication module in a first embodiment of the present invention.

FIG. 1 is a side view showing an optical communication module in a first embodiment of the present invention. The optical communication module 1 is, as shown in FIG. 1, composed of a mainframe 2 formed from resin and the like, and a shield plate 3 for covering the mainframe 2 to prevent an influence of external electromagnetic noise. On the lower side of the mainframe 2, there is provided a positioning pin 4 for positioning the optical communication module 1 in the process of mounting thereof on a mounting board. Also, the mainframe 2 has a holder portion 2a for detachably holding an optical plug (unshown), and the holder portion 2a is provided with an insertion hole 5 into which an optical plug (unshown) is inserted.

Figure 2:
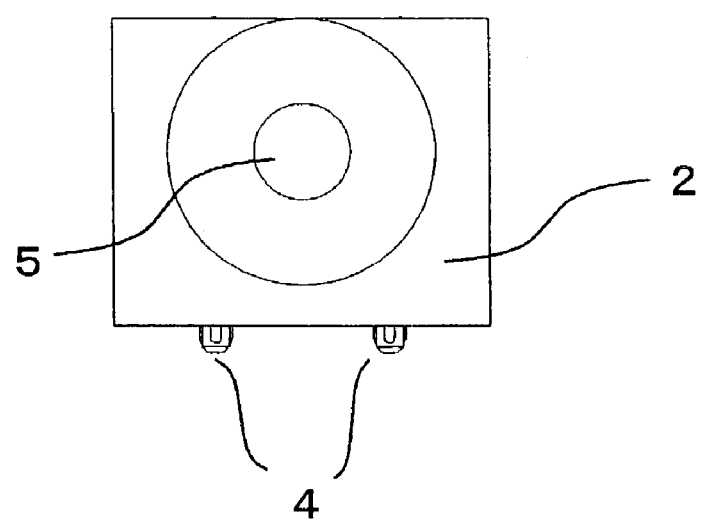
FIG. 2 is a view showing the optical communication module seen from the side of an optical plug insertion hole.

FIG. 2 is a view showing the optical communication module seen from the side of the optical plug insertion hole 5. As shown in FIG. 2, two positioning pins 4 are provided on the lower side of the mainframe 2 for increasing positioning accuracy in the process of mounting the optical communication module 1 on a mounting board.

Figure 3:
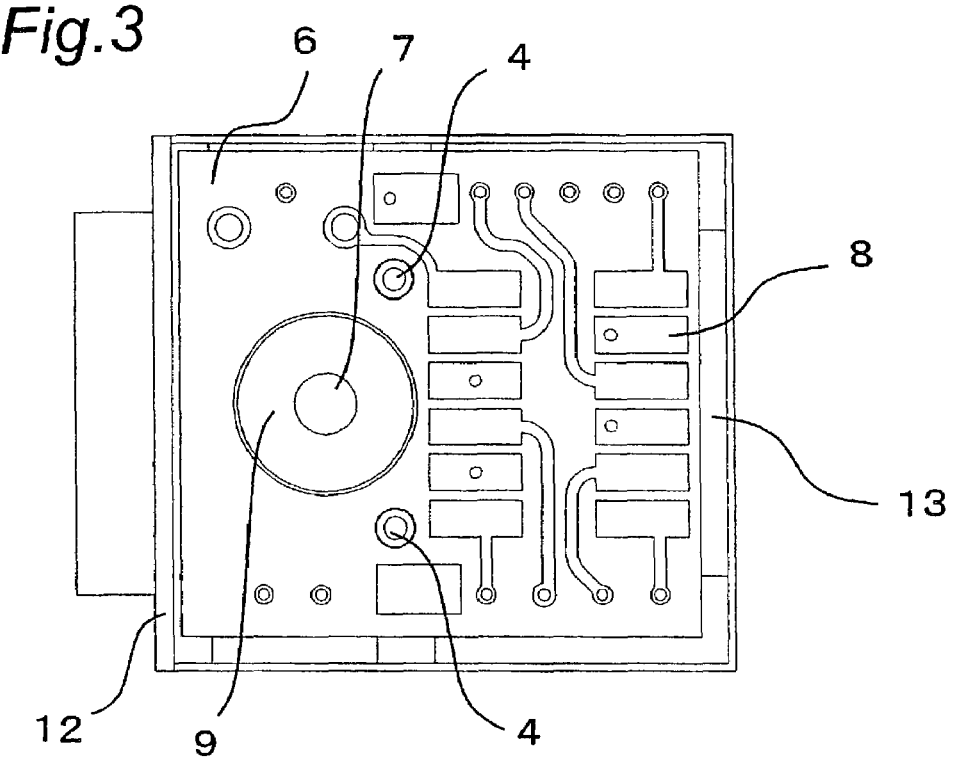
FIG. 3 is a bottom view showing the optical communication module.
Figure 4:
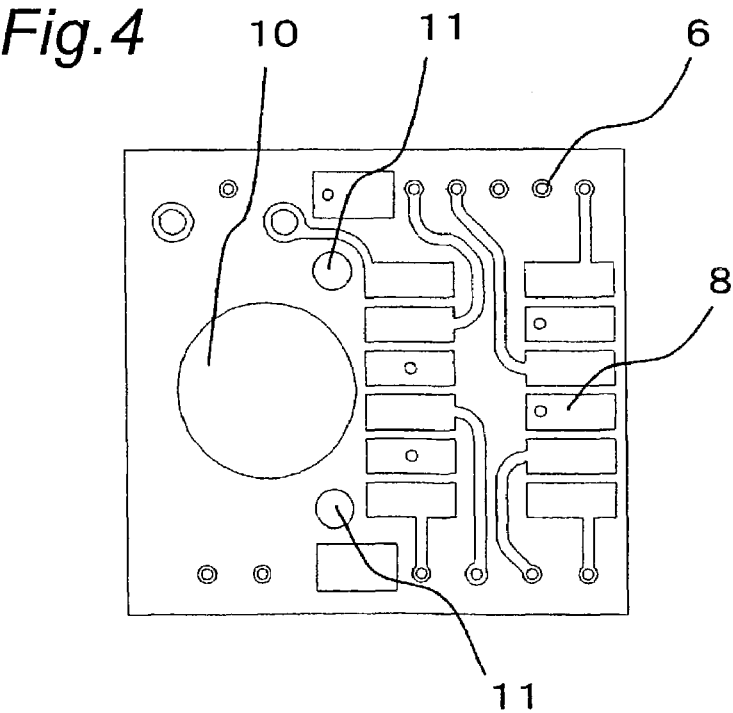
FIG. 4 is a view showing the lower face side of an input/output board of the optical communication module.

Further, FIG. 3 is a bottom view showing the optical communication module 1, and FIG. 4 is a view showing an input/output board 6 as one example of an external connection board provided on the bottom side. In FIG. 3, reference numerals 12, 13 denote support portions protruding downward from the lower face of the input/output board 6.

As shown in FIGS. 3 and 4, the input/output board 6 is provided on a recess portion provided on the bottom face side of the optical communication module 1, and on the lower face side of the input/output board 6, there is provided an electrode portion 8 that comes into contact with a connection terminal of a connector mounted on a mounting board (unshown) for inputting and outputting electric signals. Two rows of the electrode portions 8 are disposed on the input/output board 6 along the direction approximately orthogonal to the insertion direction of the optical plug. For allowing the optical communication module 1 and the mounting board (unshown) to be fixed each other with a tapping screw and the like as an example of fixing means, there is provided a screw hole 7 on the lower side of the mainframe 2 and on the side of the holder portion 2a when forming the mainframe 2.

As shown in FIG. 3, a peripheral portion 9 of the screw hole 7 is formed to be a support portion that is structured to have the same height as an installation face (a face in contact with a plane face of the mounting board) of the optical communication module 1 so as to come into contact with the mounting board for reliably fixing the mainframe on the mounting board with a tapping screw and the like. Likewise, the lower edge of the support portions 12, 13 are structured to have the same height as the installation face of the optical communication module 1. Also, as shown in FIG. 4, the input/output board 6 is provided with a hole portion 10 so as to avoid the peripheral portion 9 of the screw hole 7. Since positioning is performed by inserting the positioning pin 4 (shown in FIG. 3) into the mounting board, the input/output board 6 is given a hole portion 11 so as to avoid the positioning pin 4.

Figure 5:
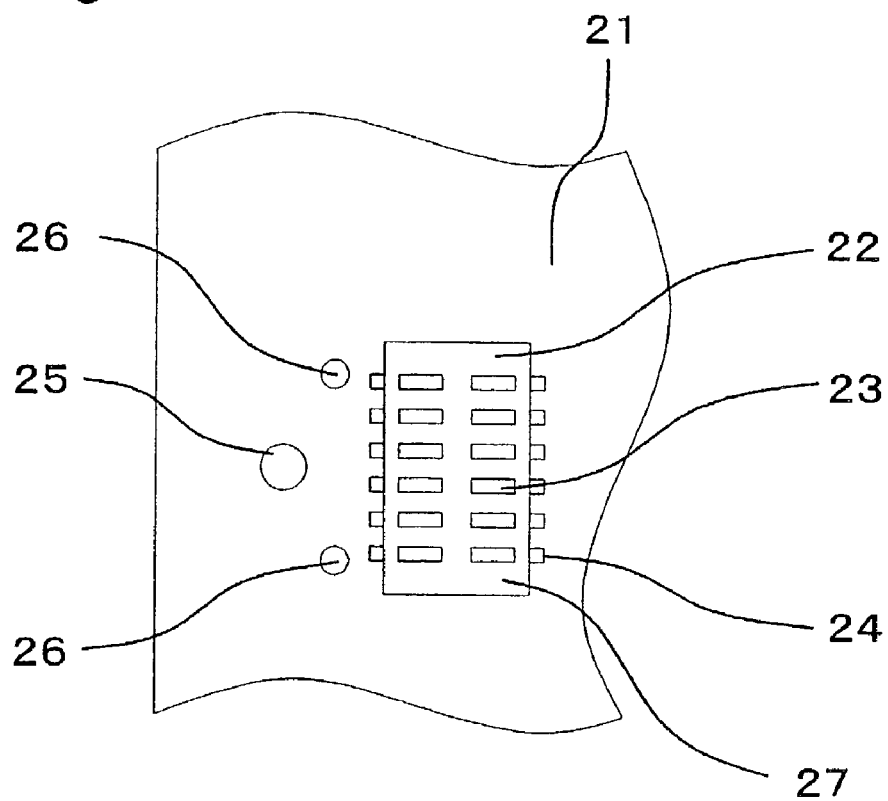
FIG. 5 is a top view showing a mounting board on which the optical communication module is mounted.
Figure 6:
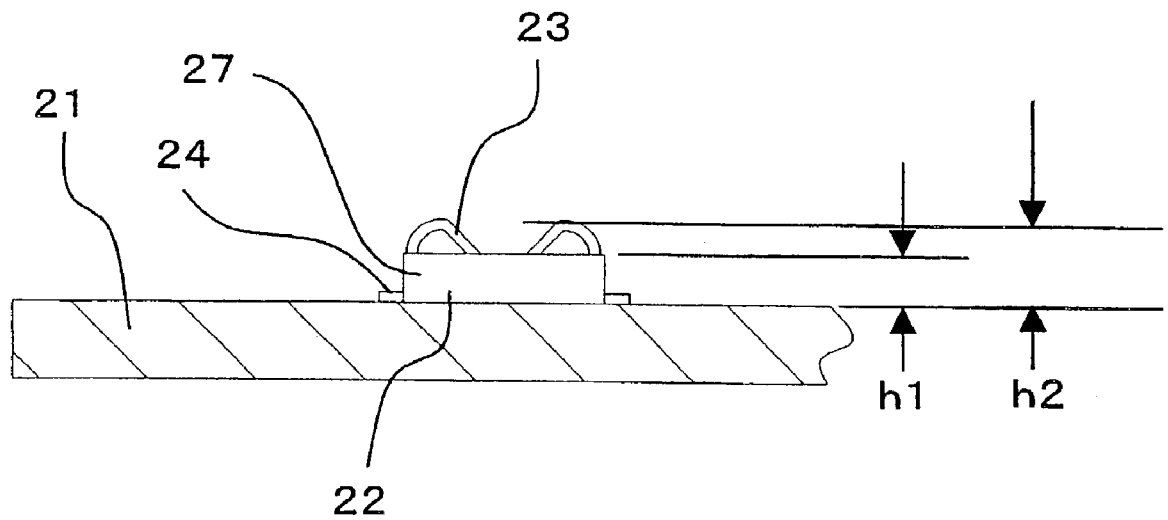
FIG. 6 is a side view showing the mounting board.

FIG. 5 is a top view showing a mounting board 21 on which the optical communication module 1 (shown in FIG. 1) is mounted, and FIG. 6 is a side view showing the mounting board 21.

As shown in FIGS. 5 and 6, the optical communication module 1 and the mounting board 21 on which the optical communication module 1 (shown in FIG. 1) is mounted are electrically connected to each other through an electrode portion (unshown) on the mounting board 21 and a connector-use connection terminal 24 of a connector 22 with use of a solder by reflowing and the like. A connection terminal 23 of the connector 22 protrudes over the upper face of a housing 27 of the connector 22 and has elasticity. The connection terminal 23 of the connector 22 can come into contact with the electrode portion 8 of the input/output board 6 (shown in FIG. 3) on the optical communication module 1 and establishes electric connection. Since the connection terminal 23 of the connector 22 has elasticity, disposing the connection terminal 23 so as to establish electric connection while deforming elastically upon coming into contact with the electrode portion 8 of the input/output board 6, makes it possible to reduce failures such as poor contact due to mounting offset between the optical communication module 1 and the mounting board 21 in the height direction. The mounting board 21 is provided with a screw hole 25 for a tapping screw and the like as an example of a fixing means of the optical communication module 1 and the mounting board 21, and is also provided with two holes 26 whose size corresponds to the positioning pin 4 provided on the optical communication module 1 for increasing positioning accuracy of the optical communication module 1 with the connector 22 mounted on the mounting board 21.

Figure 7:
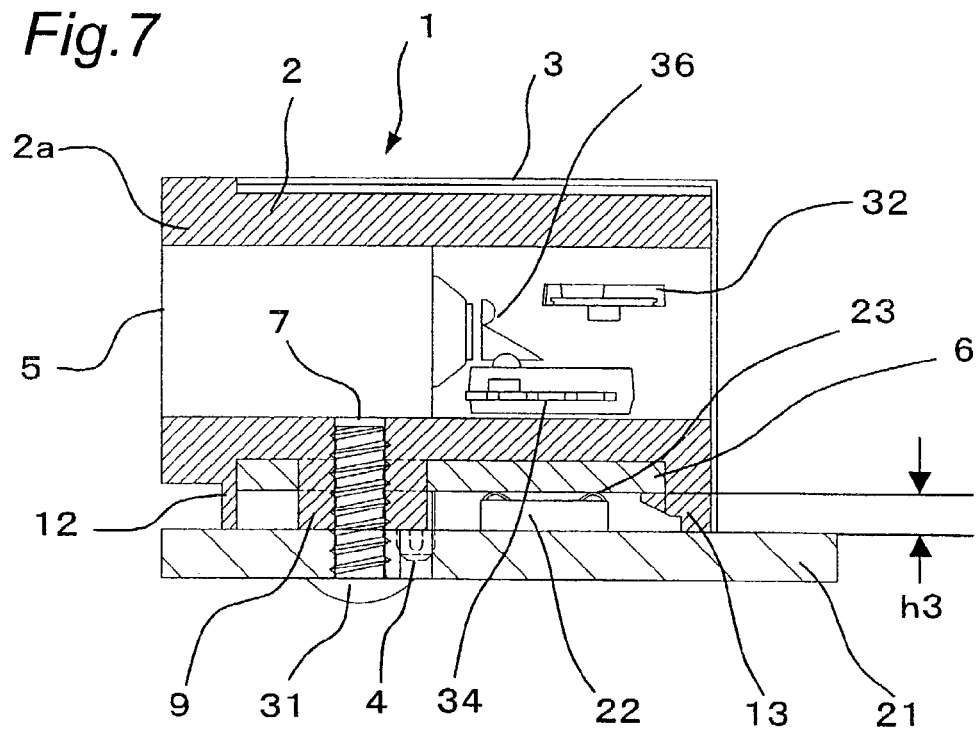
FIG. 7 is a cross sectional view showing the optical communication module in the state of being mounted on the mounting board.
Figure 8:
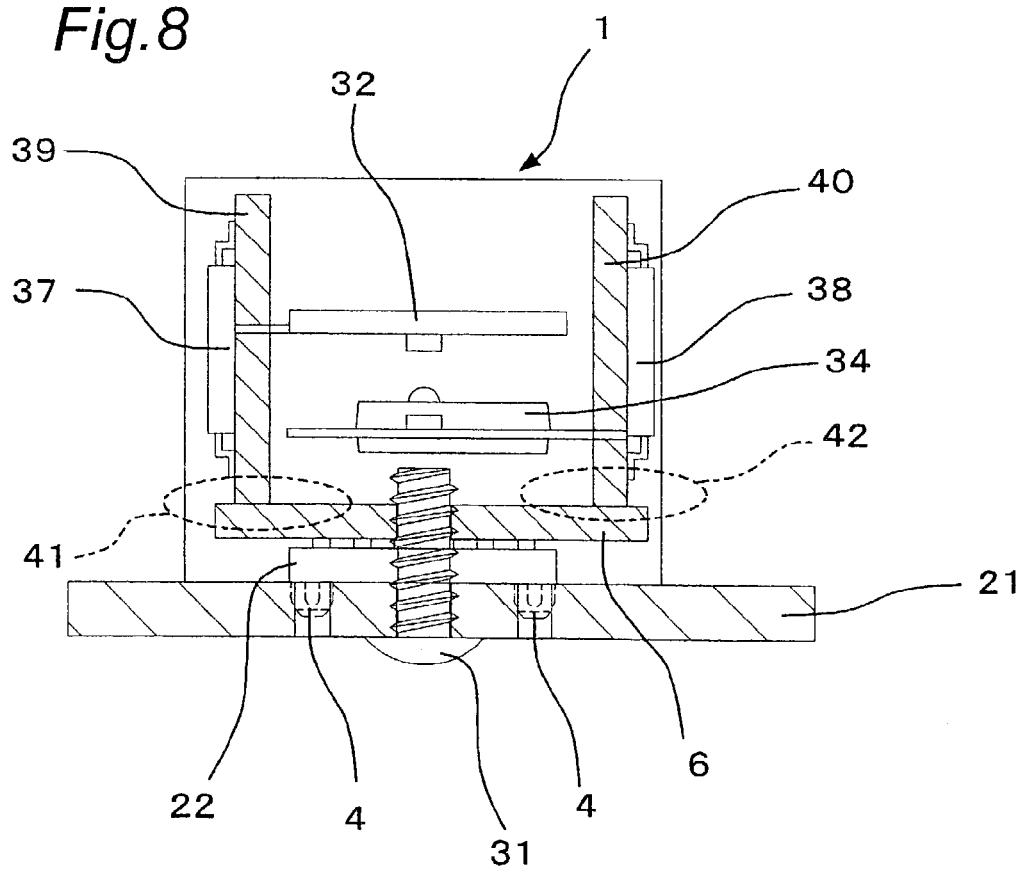
FIG. 8 is a cross sectional view showing the optical communication module in the state of being mounted on the mounting board seen from the side of the optical plug insertion hole.

FIG. 7 is a cross sectional view showing the optical communication module 1 in the state of being mounted on the mounting board 21, and FIG. 8 is a cross sectional view showing the optical communication module 1 in the state of being mounted on the mounting board 21 seen from the side of the optical plug insertion hole.

As shown in FIGS. 7 and 8, the peripheral portion 9 of the screw hole 7 and the support portions 12, 13 are structured to have the same height as the installation face (a face in contact with the plane face of the mounting board) of the optical communication module 1, while the mainframe 2 is structured so as not to incline with respect to the mounting board 21, and a space is formed between the lower face of the input/output board 6 and the mounting board 21. Also, on the mounting board 21 on which the connector 22 is mounted, there is provided a insertion hole 26 (shown in FIG. 5) corresponding to the positioning pin 4 of the optical communication module 1. The positioning pin 4 of the optical communication module 1 is inserted into the insertion hole 26 for positioning and fixing.

Since highly accurate mounting of the optical communication module 1 on the mounting board 21 is possible based on manufacturing accuracy of the positioning pin 4 of the optical communication module 1 and the insertion hole 26 of the mounting board 21, relative offset can be sufficiently decreased. Also on the bottom portion of the connector 22 mounted on the mounting board 21, a positioning protrusion is provided (unshown), and an insertion hole (unshown) corresponding to the positioning protrusion is formed simultaneously with the insertion hole 26. This makes it possible to sufficiently decrease offset between the electrode portion 8 (shown in FIG. 3) provided on the input/output board 6 of the optical communication module 1 and the connection terminal 23 of the connector 22. Therefore, it becomes possible to establish reliable electric connection between the electrode portion 8 of the input/output board 6 and the connector 22 mounted on the mounting board 21. Thus, the electrode portion 8 provided on the input/output board 6 functions as an electrode for inputting and outputting electric signals in/from the mounting board 21.

In this first embodiment, two positioning pins 4 are provided on the optical communication module 1, and structured to allow increase of positioning accuracy such as rotational direction in the of mounting process. This makes it possible to establish reliable electric connection between the electrode portion 8 of the input/output board 6 and the connector 22 mounted on the mounting board 21.

Further, with use of a screw 31 such as a tapping screw and the like inserted from the bottom face side of the mounting board 21, the mounting board 21 and the optical communication module 1 are fixed to each other. At this point, the electrode portion 8 (shown in FIG. 3) of the input/output board 6 of the optical communication module 1 comes into contact with the connection terminal 23 of the connector 22 mounted on the mounting board 21 for establishing electric connection. The optical communication module 1 incorporates a light emitting device 32 (semiconductor laser), a light receiving device 34 (photo diode), a circuit board 39 for driving light emitting device with a light emitting device-use driving circuit 37 being mounted thereon, a circuit board 40 for processing light receiving device signal with a light receiving device-use signal processing circuit 38 being mounted thereon, and an optical separating and combining device 36 for combining and separating an optical signal with respect to an inserted optical plug.

The structure and mounting method of the optical communication module 1 prevents generation of thermal stress and electrostatic destruction when mounting. In addition, electric connection to the mounting board 21 is established not by a solder but by contact pressure, and the optical communication module 1 is fixed by means of the screw 31 such as taping screws. Consequently, at the time of failure of the optical communication module 1, detaching the optical communication module 1 only by removing the screw 31 enables easy replacement of the optical communication module 1, which makes it possible to implement an optical communication module and a mounting method thereof which hardly cause failure to the peripheral portion at the time of replacement.

Also, as a fixing means of the optical communication module 1, a screw such as tapping screws is used for fixing, which can ensure fixing on the mounting board 21, and can establish good electric connection between the electrode portion 8 of the input/output board 6 on the optical communication module 1 and the connection terminal 23 of the connector 22 mounted on the mounting board 21. Further, it becomes possible to restrain stress applied to input/output terminals (the electrode portion 8 and the connection terminal 23 of the connector 22) at the time of attaching and detaching an optical plug. Also, since the input/output terminals (the electrode portion 8 and the connection terminal 23 of the connector 22) of the optical communication module 1 achieves electric connection by contact pressure, it becomes possible to restrain stress applied to the input/output terminals at the time of detaching and attaching an optical plug compared to the method in which electric connection to the mounting board is established by soldering and the like.

Therefore, providing one screw-fixing means such as tapping screws and the like ensures establishment of electric connection of the input/output terminals (the electrode portion 8 and the connection terminal 23 of the connector 22) and implementation of sure mechanical connection thereof.

In the first embodiment, as shown in FIG. 8, the circuit board 39 for driving light emitting device and the circuit board 40 for processing signal of light receiving device are structured to be disposed in the state of standing vertically against the input/output board 6 in the optical communication module 1, and achieve electric connection in connection portions 41, 42 to the input/output board 6. Further, an optical plug insertion hole 5 is structured to interpose between the both boards (39, 49). Thus, by disposing the optical plug insertion hole 5 between the circuit board 39 for driving light emitting device and the circuit board 40 for processing signal of light receiving device, a distance between the circuit board 39 for driving light emitting device and the circuit board 40 for processing signal of light receiving device can be enlarged. This makes it possible to facilitate electromagnetic separation between the circuit board 39 for driving light emitting device with the light emitting device-use driving circuit 37 being mounted thereon and the circuit board 40 for processing signal of light receiving device with the light receiving device-use signal processing circuit 38 being mounted thereon, thereby enabling reduction of influence of electromagnetic coupling noise. Therefore, it becomes possible to implement an optical communication module having a high signal-to-noise ratio without degrading transmission sensitivity and reception sensitivity.

Figure 9:
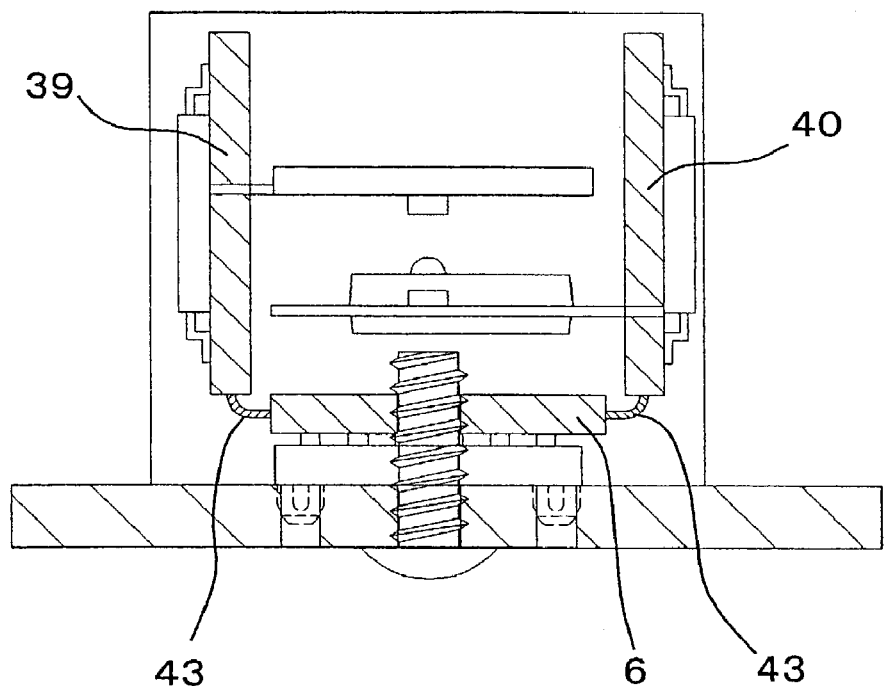
FIG. 9 is a cross sectional view showing the optical communication module in the case of being connected by a flexible board seen from the side of the optical plug insertion hole.

In the first embodiment, electric connection among the input/output board 6, the circuit board 39 for driving light emitting device, and the circuit board 40 for processing signal of light receiving device is structured to be established by soldering. However, as shown in FIG. 9, connection between the input/output board 6 and the both boards 39, 40 may be structured to be established by a flexible board 43 or a wire line.

In this first embodiment, the positional relation of: a height h1 of the housing 27 of the connector 22 mounted on the mounting board 21 shown in FIG. 6; a height h2 of the connector 22 obtained by adding a height of the connection terminal 23 in the state prior to coming into contact with the input/output board 6 (the unstressed state without being elastically deformed) to the height h1 of the housing 27; and a depth h3 in the height direction of the recess portion on the bottom face portion of the optical communication module 1 shown in FIG. 7 is defined as follows:

$$h1 \leq h3 \leq h2$$

Accordingly, it becomes possible to reduce failures such as poor contact due to mounting offset in the height direction between the optical communication module 1 and the mounting board 21.

In the first embodiment, there is used a connector having the height h1 of the housing of the connector 22 on the mounting board 21 being 1 mm and the height h2 of the connector 22 including the connection terminal 23 in the state prior to coming into contact with the input/output board 6 being 1.7 mm. Eventually, the depth h3 of the recess portion on the bottom face portion of the optical communication module 1 is set to 1.3 mm. As a result, upon coming into contact with the electrode portion 8 of the input/output board 6, the connection terminal 23 of the connector 22 is electrically connected thereto while being elastically deformed. This makes it possible to reduce failures such as poor contact due to mounting offset in the height direction between the optical communication module 1 and the mounting board 21.

Also, since the connector 22 of the mounting board 21 is structured to be housed in the recess portion of the optical communication module 1, it becomes possible to decrease a mounting area and decrease a height when mounting is performed.

Also, as shown in FIG. 3, in the region of the input/output board 6 on the opposite side of the insertion hole 5 in the holder portion 2a of the mainframe 2 shown in FIG. 7 along the direction approximately orthogonal to the insertion direction of an optical plug, there are two electrode rows composed of a plurality of arrayed electrode portions 8 on the input/output board 6. This makes it possible to shorten a distance from the screw hole 7 as an example of a fixing means to each electrode portion 8 on the input/output board 6, so that an influence of force exerted to the holder portion 2a when attaching the optical plug can be decreased, thereby enabling increase of reliability in electric connection.

Also, use of the screw hole 7 provided on the lower side of the mainframe 2 as a fixing means enables fixing of the optical communication module on the mounting board with simple structure.

Also, inserting the positioning pin 4 provided on the lower side of the mainframe 2 as an example of the positioning means into the insertion hole 26 of the mounting board 21 enables reliable positioning with simple structure.

In the first embodiment, description has been given of the optical communication module 1 composed of the light emitting device 32, the light receiving device 34, the light emitting device-use driving circuit 37, and the light receiving device signal processing circuit 38. However, the present invention is applicable to an optical communication module compose of either one of the transmission device and the reception device. Further, although in the first embodiment, a semiconductor laser is used as an example of the semiconductor light emitting device, LED is also usable.

Also, although the screw hole 7 as an example of the fixing means and the positioning pin 4 as an example of the positioning means are integrally formed when forming the mainframe 2, they may be structured to be separately inserted and assembled after forming the mainframe 2. Also, as an example of the fixing means, screwing with a tapping screw is used. However, the fixing means is not limited thereto, and fixing on the mounting board may be achieved by bonding, welding or engagement of a hook and the like.

Also in the first embodiment of the optical communication module, an inserted optical plug is a single head plug. However, the form of the optical plug is not limited thereto, and therefore the optical communication module may use connectors including F05 type (square connector), double-core F07 type, double-core PN type, SC type and FC type as well as other special connectors.

Second Embodiment

Figure 10:
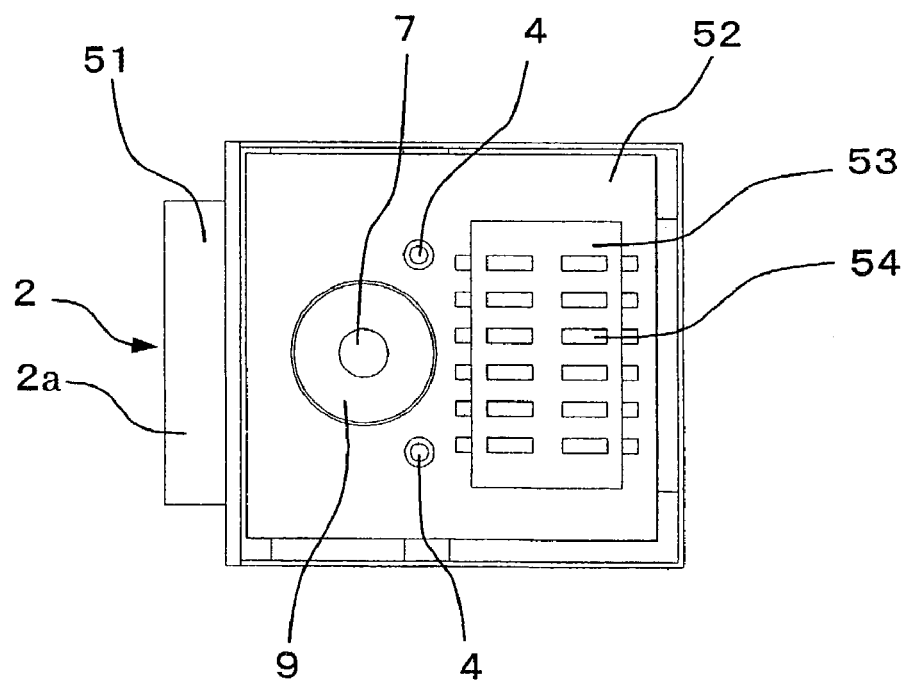
FIG. 10 is a bottom view showing an optical communication module in a second embodiment of the present invention.
Figure 11:
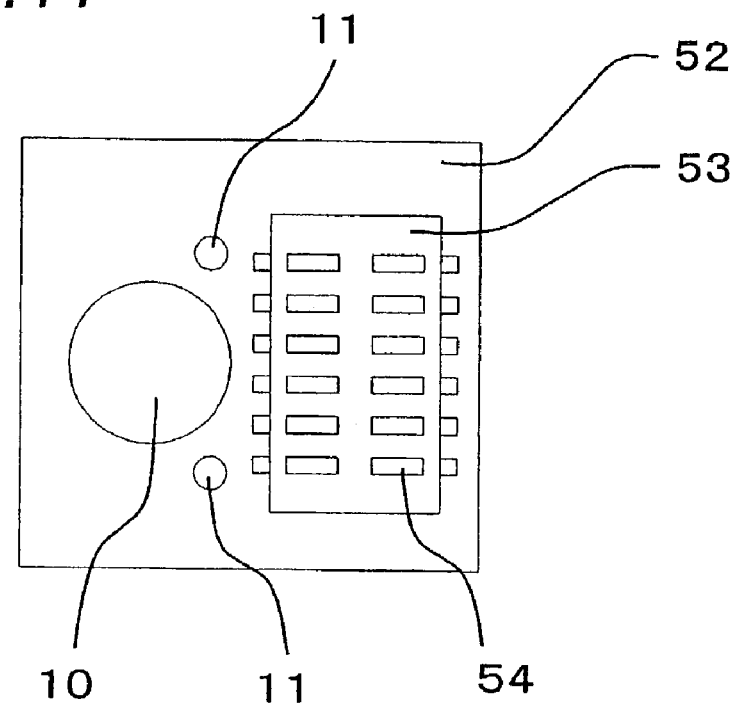
FIG. 11 is a bottom view showing an input/output board of the optical communication module.
Figure 12:
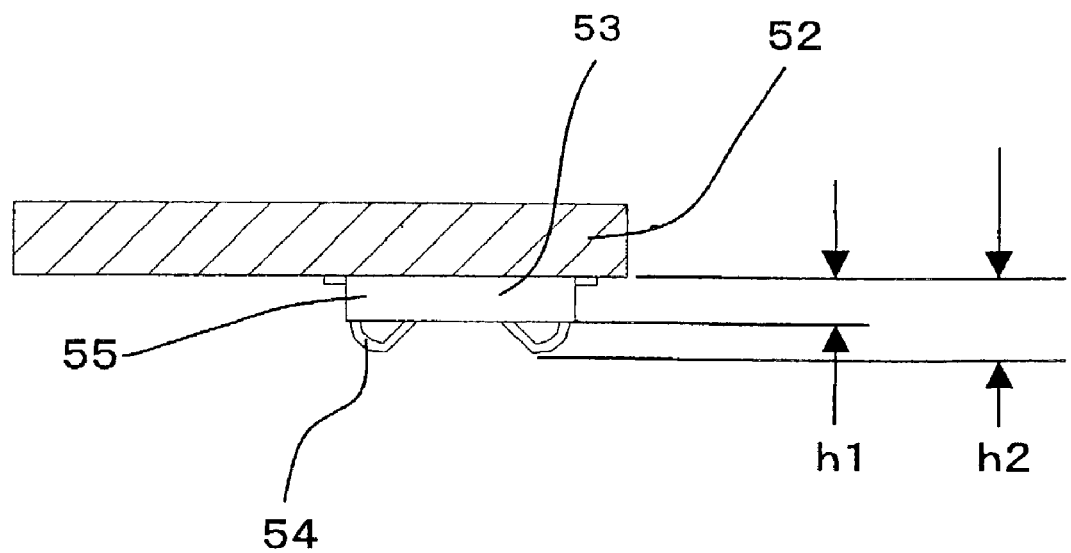
FIG. 12 is a side view showing the input/output board.

FIG. 10 is a bottom view showing an optical communication module in a second embodiment of the present invention, FIG. 11 is a bottom view showing an input/output board as an example of an external connection board of the optical communication module, and FIG. 12 is a side view showing the input/output board 52. The optical communication module of the second embodiment is different from the first embodiment in the point that on the input/output board 52 disposed on the lower side of the optical communication module 51, there is mounted a connector 53 provided with an elastic connection terminal 54 that comes into contact with an electrode portion of the mounting board for inputting and outputting electric signals, and the mounting board is provided with an electrode portion in the position corresponding to the connection terminal 54 of the connector 53. As for other aspects, the present embodiment shares the same constitution with the first embodiment, and therefore like component members are designated by like reference numerals for omitting explanation.

As shown in FIG. 10, in a recess portion provided on the bottom face of the optical communication module 51, an input/output board 52 is provided, and the connector 53 is mounted on the input/output board 52 by reflowing. The connection terminal 54 of the connector 53 has elasticity, and an electrode portion (unshown) of the mounting board provided in the position corresponding to the connection terminal 54 is brought into contact with the connection terminal 54 of the connector 53 for inputting and outputting electric signals. Other aspects are the same as those in the first embodiment.

Figure 13:
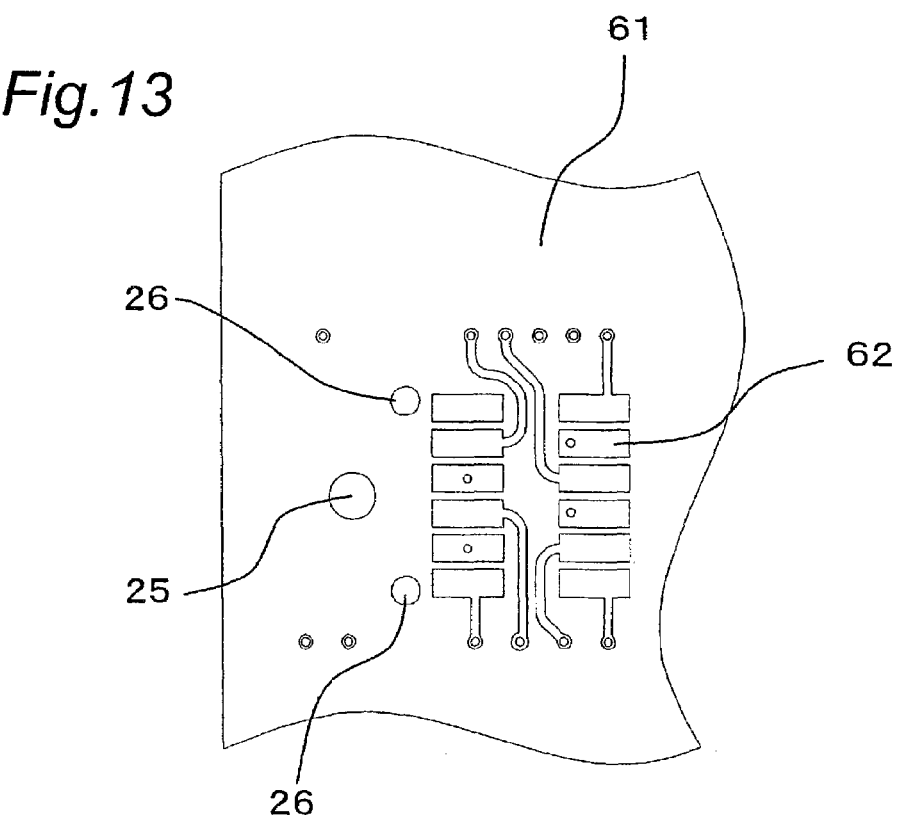
FIG. 13 is a top view showing a mounting board on which the optical communication module is to be mounted.

FIG. 13 is a plane view showing a mounting board 61 on which the optical communication module 51 (shown in FIG. 10) of the second embodiment is mounted seen from the top side. As shown in FIG. 13, on the mounting board 61 on which the optical communication module 51 is mounted, there is provided an electrode portion 62 in the position corresponding to the elastic connection terminal 54 of the connector 53 mounted on the input/output board 52 shown in FIGS. 10 to 12, which can come into contact with the connection terminal 54 of the connector 53 and establish electric connection. As for other aspects, the present embodiment is the same as the first embodiment.

Figure 14:
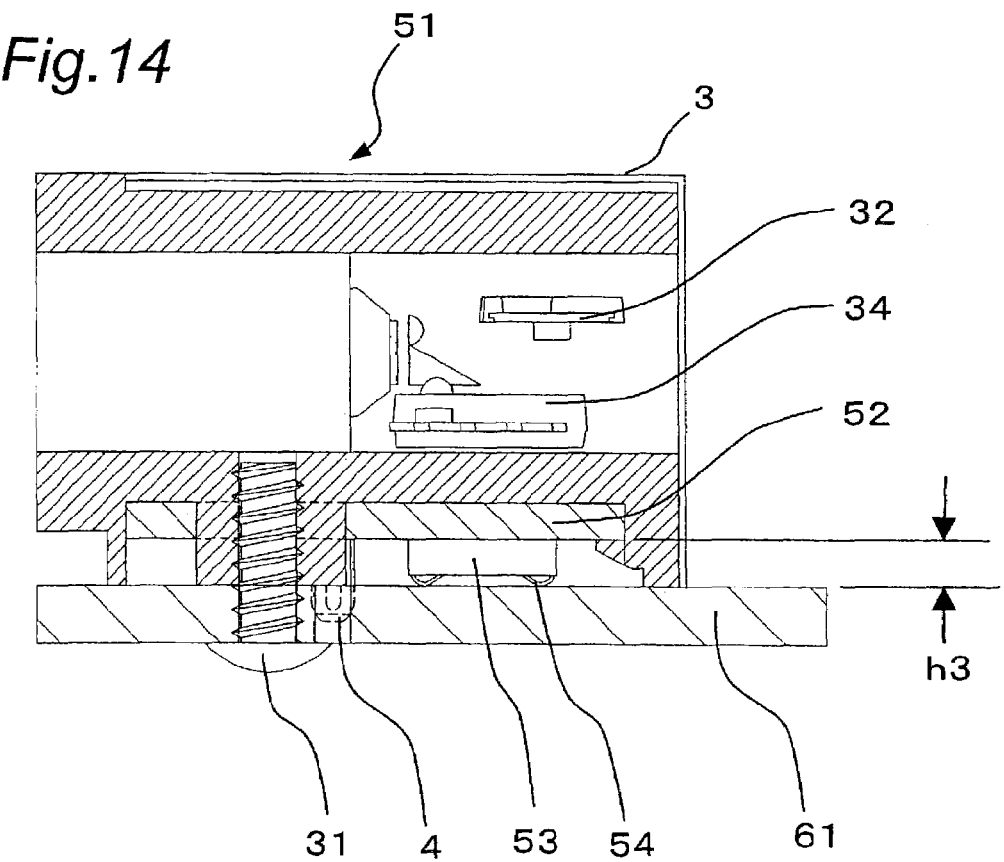
FIG. 14 is a cross sectional view showing the optical communication module in the state of being mounted on the mounting board.

Also, FIG. 14 is a cross sectional view showing the optical communication module 51 of the second embodiment in the state of being mounted on the mounting board 61. As shown in FIG. 14, the present embodiment may be mounted like the first embodiment.

Also, as shown in FIG. 12, if the present embodiment adopts the same size as that in the first embodiment as for the positional relation of: a height h1 of a housing 55 of the connector 53; a height h2 of the connector 53; and a depth h3 in the height direction of the recess portion on the bottom face portion of the optical communication module 51, the same effects as those in the first embodiment can be achieved.

Also, as shown in FIG. 10, there are two terminal rows composed of plurality of arrayed connection terminals 54 of the connector 53 in a region positioned on the side opposite to an insertion hole 5 of the holder portion 2a of the mainframe 2 along a direction approximately orthogonal to the insertion direction of the optical plug. This makes it possible to shorten the distance from the screw hole 7 as an example of the fixing means to each connection terminal 54 of the connector 53, so that an influence of force applied to the holder portion 2a to each connection terminal 54 when attaching the optical plug may be decreased, thereby enabling increase of reliability in electric connection.

Other effects may be implemented as with the first embodiment.

Third Embodiment

Figure 15:
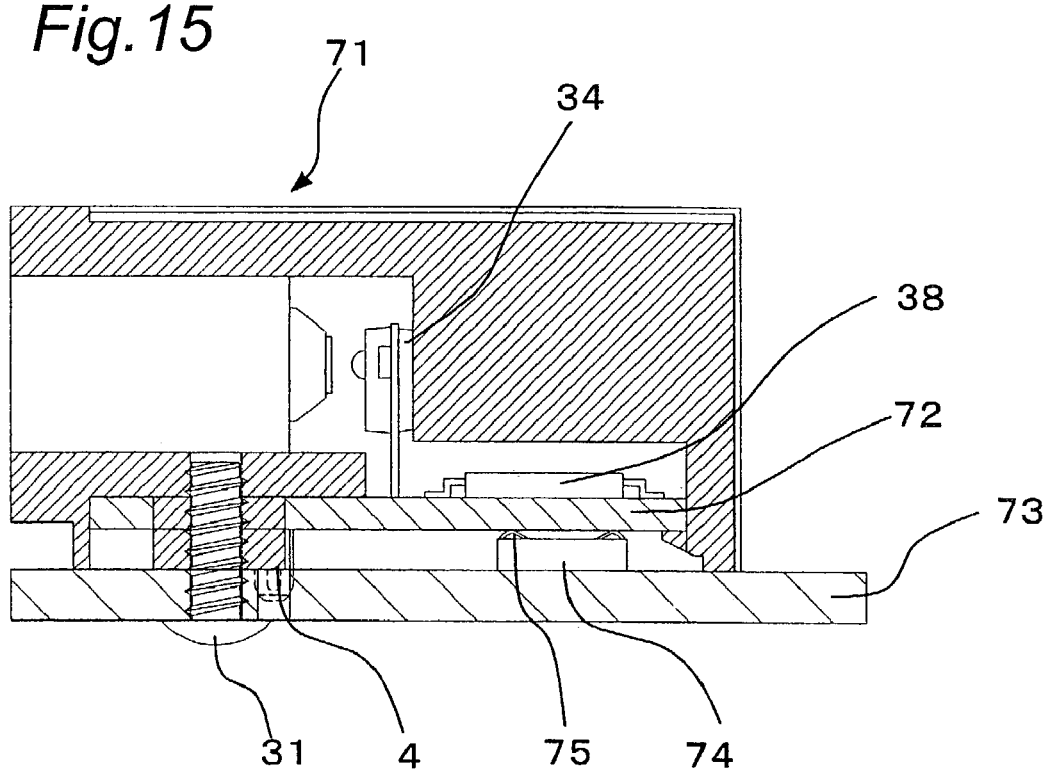
FIG. 15 is a cross sectional view showing an optical communication module in a third embodiment of the present invention in the state of being mounted on a mounting board.
Figure 16:
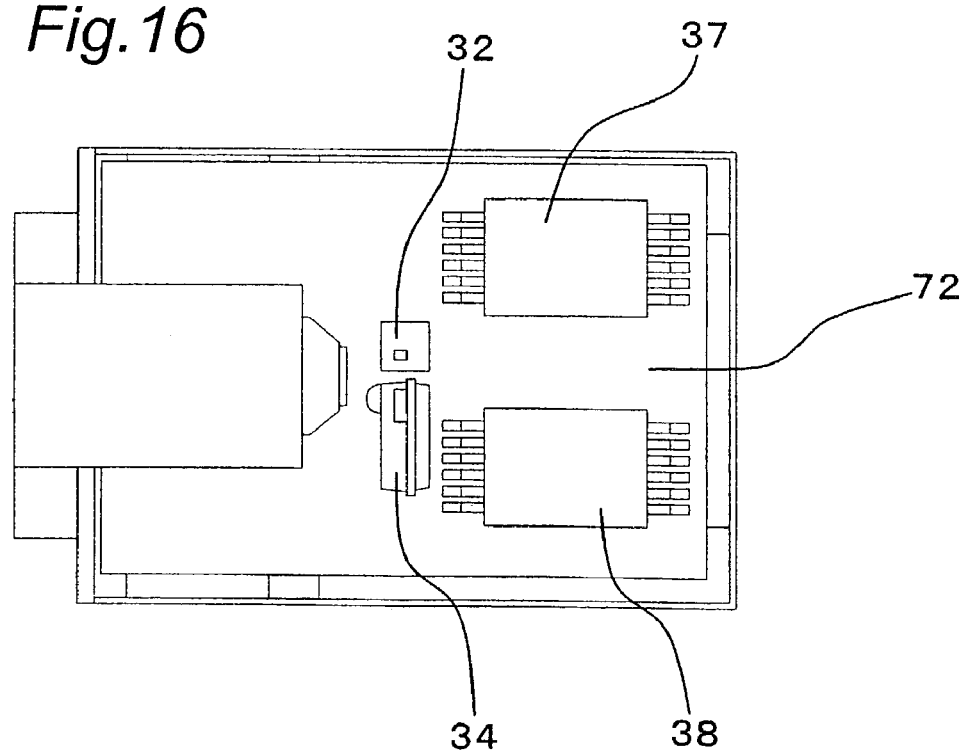
FIG. 16 is a cross sectional view showing the optical communication module seen from the top side.

FIG. 15 is a cross sectional view showing an optical communication module in a third embodiment of the present invention in the state of being mounted on a mounting board, and FIG. 16 is a cross sectional view showing the optical communication module seen from the top side. The optical communication module in the third embodiment is different from the first embodiment in the point that an input/output board 72 as an example of the external connection board disposed on the lower side of the optical communication module 71 is equipped with a circuit for driving light emitting device and a circuit for processing signal of light receiving device. More specifically, a circuit board for driving light emitting device and a circuit board for processing signal of light receiving device are not provided. As for other aspects, the third embodiment shares the same constitution with the first embodiment, and therefore like component members are designated by like reference numerals for omitting explanation.

In the third embodiment, the input/output board 72 is provided on a recess portion provided on the bottom face of the optical communication module 71, and on the bottom side of the input/output board 72, there is provided, as in the case with the first embodiment, an electrode portion (unshown) in the position corresponding to a connection terminal 75 of a connector 74 mounted on the mounting board 73. The optical communication module 71 is positioned and secured by a positioning pin 4 and a screw 31 such as tapping screws, and as a connection terminal 75 having elasticity on the connector 74 mounted on the mounting board 73 comes into contact with the electrode portion (unshown) provided on the input/output board 72 of the optical communication module 71, electric connection can be established. On the upper face of the input/output board 72, there are mounted a light emitting device driving circuit 37 for driving a light emitting device 32 and a light receiving device signal processing circuit 38 for processing a light receiving device 34.

Thus-structured optical communication module 71 of the third embodiment can be mounted as with the first embodiment.

Also, the third embodiment may implement the same effects as the first embodiment except the effect obtained by disposing the circuit board for driving light emitting device and the circuit board for processing light receiving device signal in the state of standing vertically against the input/output board in the optical communication module.

In the third embodiment, as with the first embodiment, an electrode portion is provided on the input/output board of the optical communication module. However, like the second embodiment, a connector may be mounted on the input/output board side of the optical communication module.

Fourth Embodiment

Figure 17:
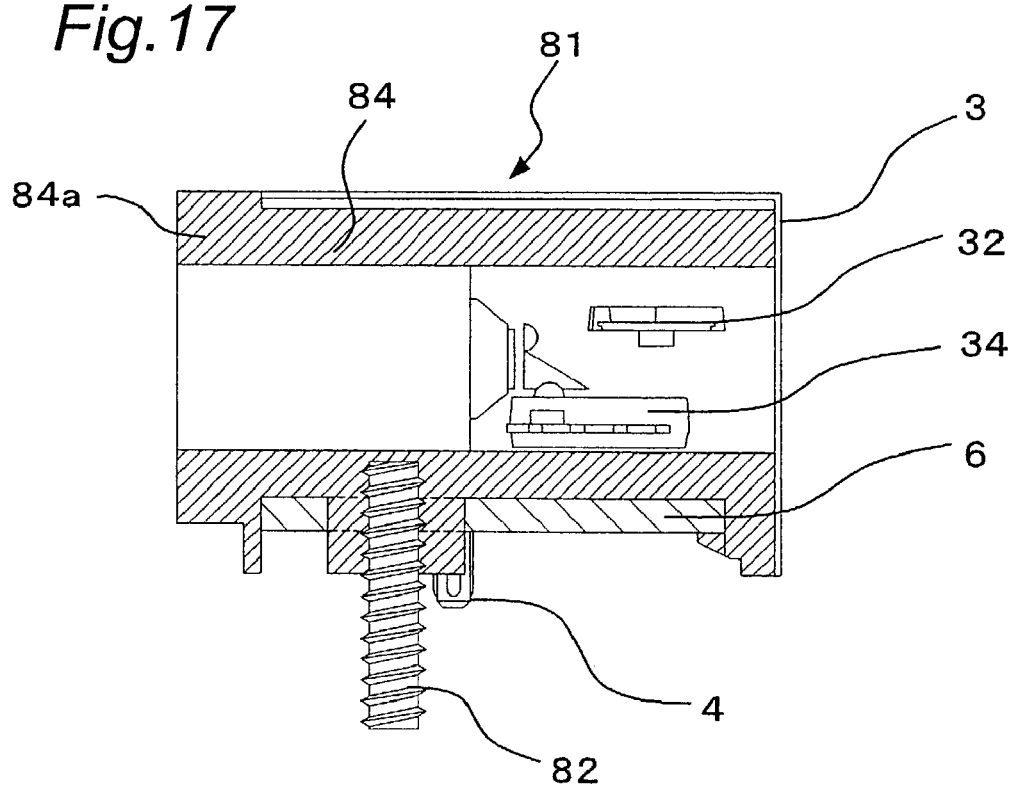
FIG. 17 is a cross sectional view showing an optical communication module in a fourth embodiment of the present invention.
Figure 18:
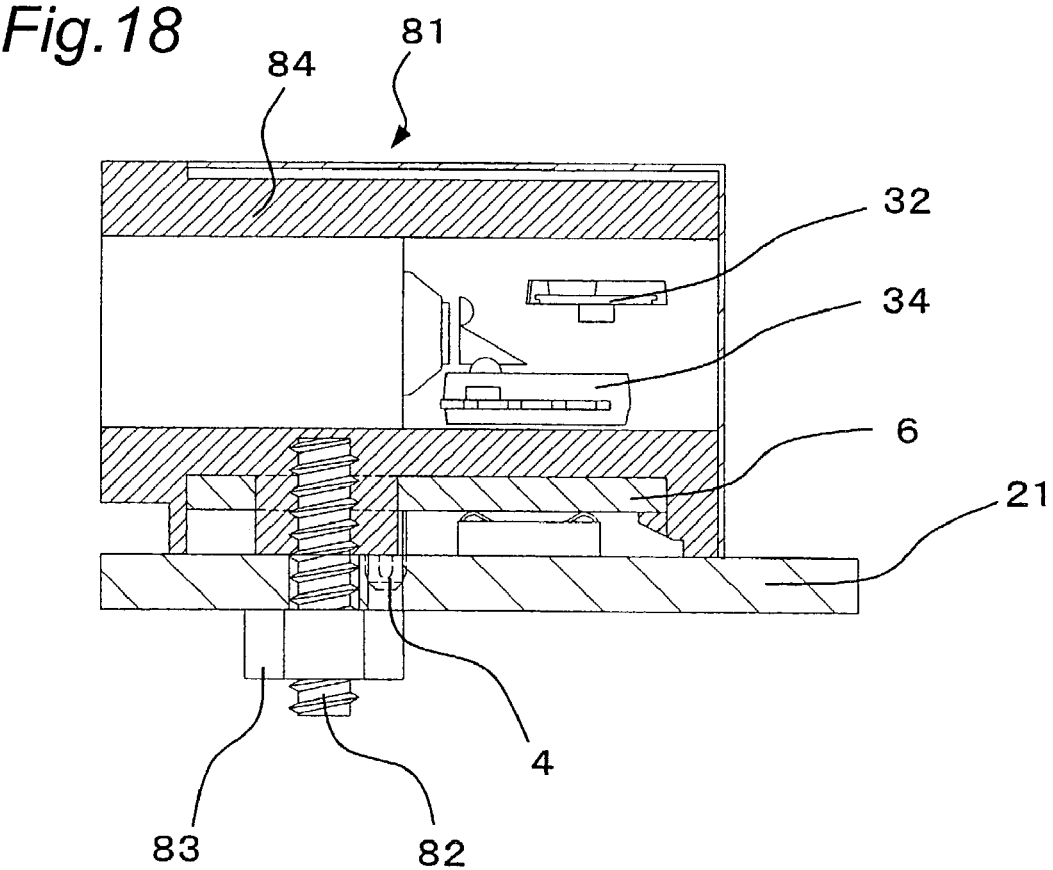
FIG. 18 is a cross sectional view showing the optical communication module in the state of being mounted on a mounting board.

FIG. 17 is a cross sectional view showing an optical communication module of a fourth embodiment of the present invention, and FIG. 18 is a cross sectional view showing the optical communication module in the state of being mounted on a mounting board. The optical communication module of the fourth embodiment is different from the first embodiment in the point that the optical communication module in the first embodiment is structured to have a screw hole as an example of the fixing means on the bottom face for achieving fixing on the mounting board with a tapping screw, whereas the optical communication module 81 in the fourth embodiment is structured to have a screw 82 on a mainframe 84 for achieving fixing on a mounting board 21 with a nut 83. As for other aspects, the present embodiment shares the same constitution with the first embodiment, and therefore like component members are designated by the like reference numerals for omitting explanation.

The optical communication module 81 of the fourth embodiment is structured such that when forming the mainframe 84 having a holder portion 84a, the screw 82 as an example of the fixing means is inserted and formed integrally, and the screw 82 is protruded from the optical communication module 81 by a length sufficient for fixing the optical communication module 81 on the board.

Similarly to the first embodiment, as shown in FIG. 18, the optical communication module 81 is mounted on the mounting board 21, and in this fourth embodiment, the optical communication module 81 is fixed on the mounting board 21 with use of the nut 83 corresponding to the screw 82.

In the mounting operation of the fourth embodiment, fixation of the optical communication module 81 to the mounting board 21 is reliably achieved, so that the same effects as those in the first embodiment can be implemented.

In the fourth embodiment, the screw 82 is integrally formed at the time of forming the mainframe 84. However, it is also possible that after the mainframe 84 is formed, the screw is pressure-fit in the mainframe 84. Further, it is also possible to integrally form a resin screw at the time of forming the holder.

Fifth Embodiment

Figure 19:
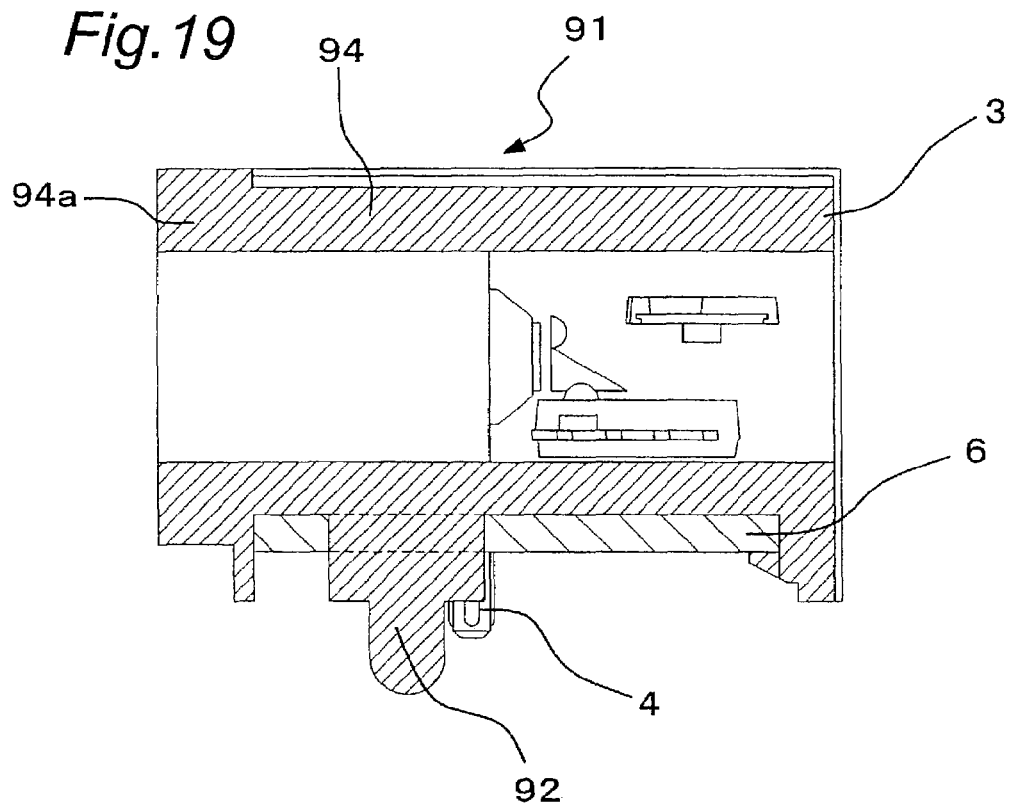
FIG. 19 is a cross sectional view showing an optical communication module in a fifth embodiment of the present invention.
Figure 20:
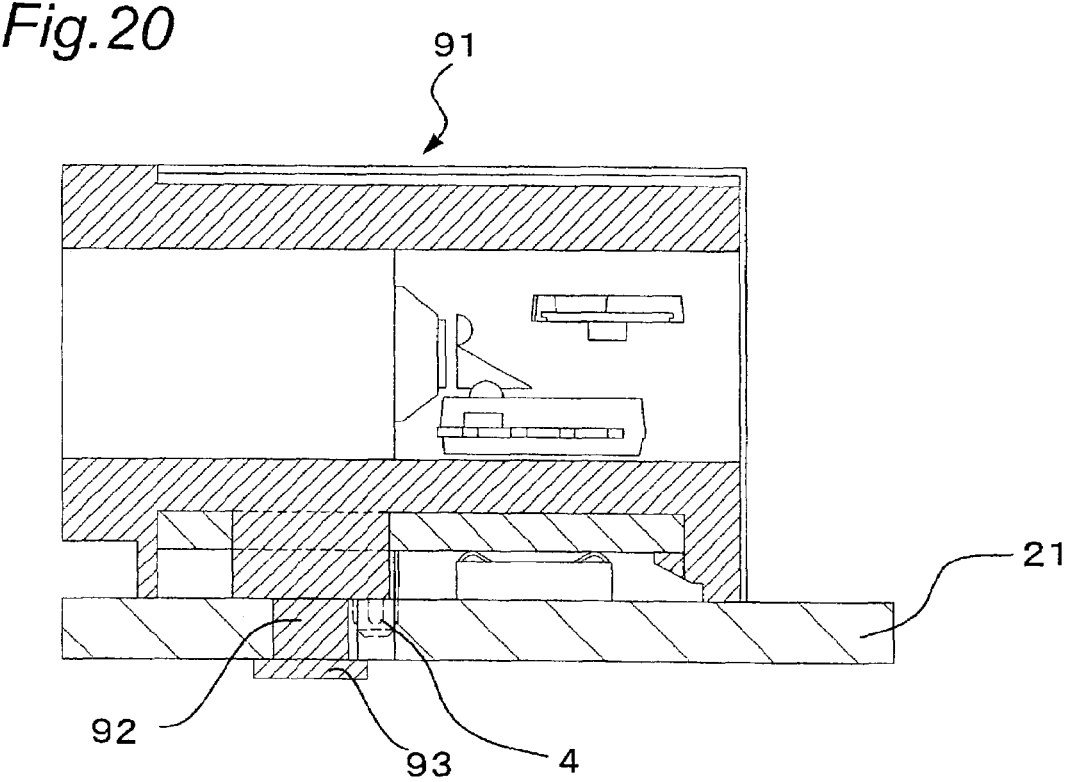
FIG. 20 is a cross sectional view showing the optical communication module in the state of being mounted on a mounting board.
Figure 22A:
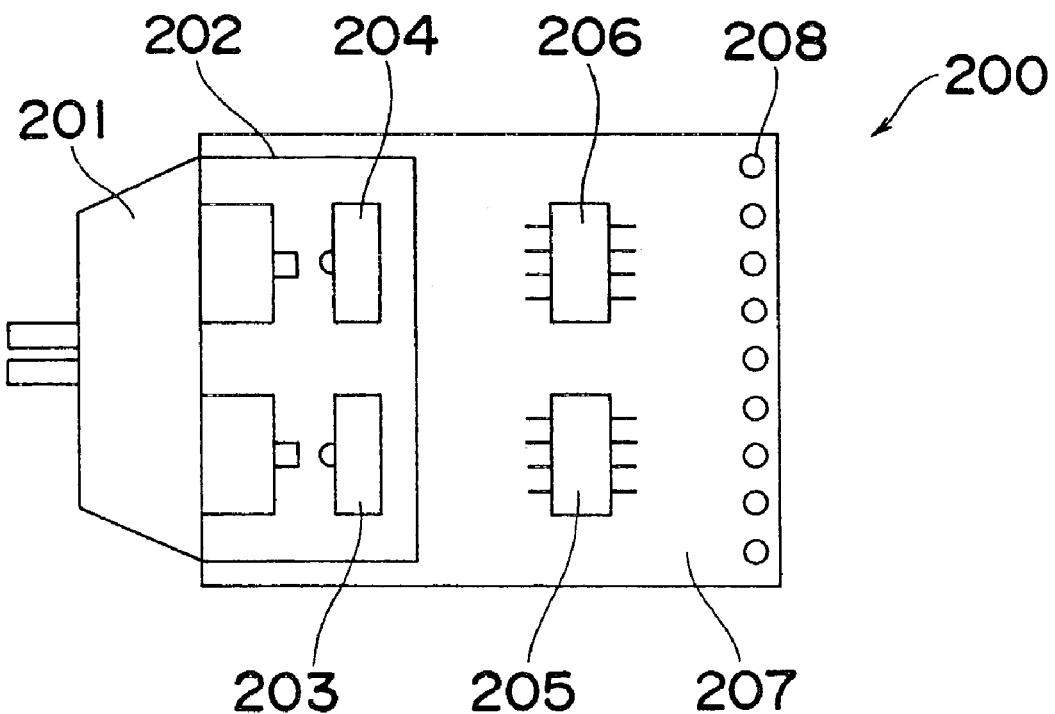
Figure 22B:
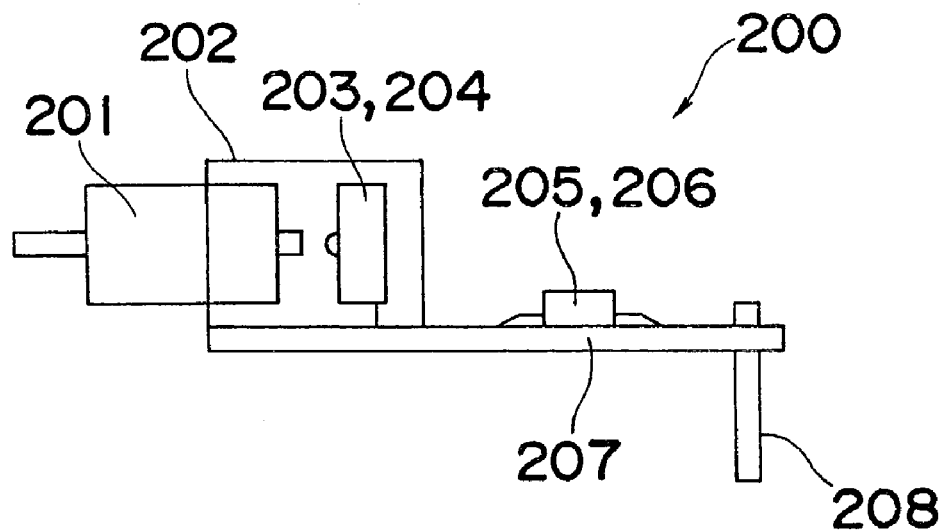
FIG. 22B is a side view showing the optical communication module.
Figure 23:
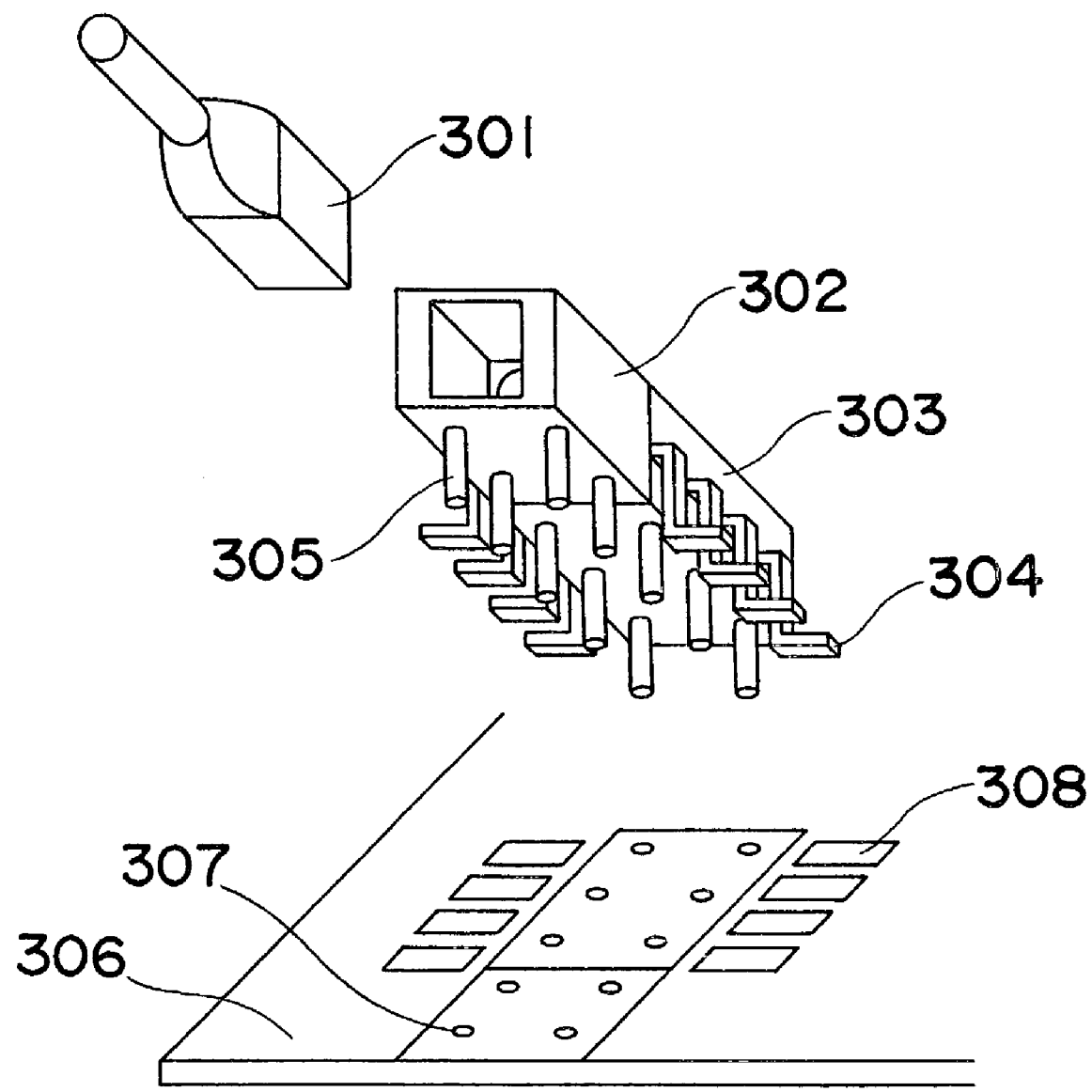
FIG. 23 is a perspective view showing a third conventional optical communication module.

FIG. 19 is a cross sectional view showing an optical communication module in a fifth embodiment of the present invention, and FIG. 20 is a cross sectional view showing the optical communication module in the state of being mounted on a mounting board. The optical communication module in the fifth embodiment is different from the first embodiment in the point that the optical communication module in the first embodiment is structured to have a screw hole as an example of the fixing means on the mainframe for achieving fixing on the mounting board with a tapping screw, whereas the optical communication module 91 in the fifth embodiment is structured to have a weld-use protrusion 92 on the lower side of a mainframe 94 and on the side of a holder portion 94a for achieving fixation on the mounting board 21 through welding of the weld protrusion. As for other aspects, the present embodiment shares the same constitution with the first embodiment, and therefore like component members are designated by like reference numerals.

The optical communication module 91 of the fifth embodiment is structured such that when forming the mainframe 94, the weld protrusion 92 as an example of the fixing means is formed integrally, and the weld protrusion 92 is protruded from the optical communication module 91 by a length sufficient for fixing the optical communication module 91 on the board.

Similarly to the first embodiment, as shown in FIG. 20, the optical communication module 91 is mounted on the mounting board 21, and the weld protrusion 92 is welded for fixing the optical communication module 91 to the mounting board 21 with use of a welded portion 93.

In this fifth embodiment, fixing the optical communication module 91 to the mounting board 21 is reliably achieved, which makes it possible to implement the same effects as those in the first embodiment.

Further, use of the weld protrusion 92 provided on the lower side of the mainframe 94 as the fixing means makes it possible to fix the optical communication module 91 on the mounting board 21 with simple structure.

The optical communication module of the present invention is applied to electronic appliances such as digital TVs (Television), digital BS (Broadcasting Satellite) tuners, CS (Communication Satellite) tuners, DVD (Digital Versatile Disc) players, super audio CD (Compact Disk) players, AV (Audio Visual) amplifiers, audio devices, personal computers, peripheral devices for personal computers, mobile phones, and PDAs (Personal Digital Assistance).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE NUMERALS

1 . . . an optical communication module
2 . . . a mainframe
2a . . . a holder portion
3 . . . a shield plate
4 . . . a positioning pin
5 . . . an insertion hole 6 . . . an input/output board
7 . . . a screw hole
8 . . . an electrode portion
9 . . . a peripheral portion
10 . . . a hole portion
11 . . . a hole portion
12, 13 . . . support portions
21 . . . a mounting board
22 . . . a connector
23 . . . a connection terminal
24 . . . a connectoruse connection terminal
25 . . . a screw hole
26 . . . holes
27 . . . a housing
31 . . . a screw
32 . . . a light emitting device
34 . . . a light receiving device
36 . . . an optical separating and combining device
37 . . . a light emitting deviceuse driving circuit
38 . . . a light receiving device-use signal processing circuit
39 . . . a circuit board
40 . . . a circuit board
41, 42 . . . connection portions
43 . . . a flexible board
51 . . . an optical communication module
52 . . . an input/output board
53 . . . a connector
54 . . . an elastic connection terminal
55 . . . a housing
61 . . . a mounting board
62 . . . an electrode portion
71 . . . an optical communication module
72 . . . an input/output board
73 . . . a mounting board
74 . . . a connector
75 . . . a connection terminal
81 . . . an optical communication module
82 . . . a screw
83 . . . a nut
84 . . . a mainframe
84a . . . a holder portion
91 . . . an optical communication module
92 . . . a weld-use protrusion
93 . . . a welded portion
94 . . . a mainframe
94a . . . a holder portion
101 . . . a casing
103 . . . a light receiving device
104 . . . a light emitting device
101b, 101c . . . an optical plug detachable port
105 . . . a ferrule holder
105b . . . a reception ferrule holder
105c . . . a transmission ferrule holder
107 . . . an electric circuit board
108 . . . an electric connection pin
201 . . . an optical plug
202 . . . a holder
203 . . . a moldpackaged light emitting device
204 . . . a light receiving device
205 . . . an integrated circuit portion
206 . . . an integrated circuit portion
207 . . . an electric circuit board
208 . . . a connection terminal
301 . . . an optical connector
302 . . . a receptacle portion
303 . . . an optical module mainframe
304 . . . an electric terminal
305 . . . a stud portion
306 . . . a mounting board
307 . . . a fixing hole
308 . . . a land

What is claimed is:

1. An optical communication module having at least either one of a light emitting device for emitting transmission light signal and a light receiving device for receiving reception light signal and performing communication with use of at least either one of the transmission light signal and the reception light signal through an optical fiber, comprising:
a mainframe having a holder portion for detachably holding an optical plug provided on an end portion of the optical fiber;
an external connection board disposed on a lower side of the mainframe;
an electrode portion provided on a lower side of the external connection board for enabling electric connection by contact pressure; and
a support portion provided on a lower side of the mainframe and protruding downward from a lower face of the external connection board.

2. An optical communication module having at least either one of a light emitting device for emitting transmission light signal and a light receiving device for receiving reception light signal and performing communication with use of at least either one of the transmission light signal and the reception light signal through an optical fiber, comprising:
a mainframe having a holder portion for detachably holding an optical plug provided on an end portion of the optical fiber;
an external connection board disposed on a lower side of the mainframe;
a connector provided on a lower face side of the external connection board and having an elastic connection terminal that enables electric connection by contact pressure; and
a support portion provided on a lower side of the mainframe and protruding downward from a lower face of the external connection board.

3. The optical communication module as defined in claim 1, comprising:
both the light emitting device and the light receiving device,
a light emitting device-use electric circuit board for driving the light emitting device; and
a light receiving device-use electric circuit board for processing a reception signal of the light receiving device, wherein
the light emitting device-use electric circuit board and the light receiving device-use electric circuit board are disposed with a space therebetween in direction orthogonal to the external connection board.

4. The optical communication module as defined in claim 1, comprising:
both the light emitting device and the light receiving device, wherein
a light emitting device-use electric circuit board for driving the light emitting device and a light receiving device-use electric circuit board for processing a reception signal of the light receiving device are provided on the external connection board.

5. The optical communication module as defined in claim 1, wherein the electrode portion is electrically connected to a mounting board through a connector having an elastic connection terminal enabling electric connection by contact pressure, and a depth from a lower face of the external connection board to a lower end of the support portion is set equal to or larger than a height of a housing of the connector.

6. The optical communication module as defined in claim 2, wherein a depth from a lower face of the external connection board to a lower end of the support portion is set equal to or larger than a height of a housing of the connector.

7. The optical communication module as defined in claim 1, further comprising:

fixing means provided on a side of the holder portion of the mainframe for fixing the mainframe to a mounting board.

8. The optical communication module as defined in claim 1, further comprising:

fixing means provided on a side of the holder portion of the mainframe for fixing the mainframe to a mounting board; and at least one electrode row composed of a plurality of the arrayed electrode portions of the connector in a region of the external connection board positioned on a side opposite to an insertion hole of the holder portion of the mainframe along a direction approximately orthogonal to an insertion direction of the optical plug.

9. The optical communication module as defined in claim 2, further comprising:

fixing means provided on a side of the holder portion of the mainframe for fixing the mainframe to a mounting board; and at least one terminal row composed of a plurality of the arrayed connection terminals of the connector in a region of the external connection board positioned on a side opposite to an insertion hole of the holder portion of the mainframe along a direction approximately orthogonal to an insertion direction of the optical plug.

10. The optical communication module as defined in claim 7, wherein the fixing means is a screw hole provided on a lower side of the mainframe.

11. The optical communication module as defined in claim 7, wherein the fixing means is a screw provided on a lower side of the mainframe so as to protrude downward.

12. The optical communication module as defined in claim 7, wherein the fixing means is a weld-use protrusion provided on a lower side of the mainframe.

13. The optical communication module as defined in claim 1, further comprising:

positioning means for positioning the mainframe with respect to a mounting board.

14. The optical communication module as defined in claim 13, wherein the positioning means is a positioning pin provided on a lower side of the mainframe.

15. A mounting method of an optical communication module as defined in claim 1, comprising the step of electrically connecting an electrode portion provided on a lower face of the external connection board of the optical communication module to a connection terminal of a connector mounted on a mounting board by contact pressure.

16. A mounting method of an optical communication module as defined in claim 2, comprising the step of electrically connecting a connection terminal of a connector provided on a lower face side of the external connection board of the optical communication module to an electrode portion provided on a mounting board by contact pressure.

17. The mounting method as defined in claim 15, further comprising the step of:

with use of a screw hole as fixing means -provided on a lower side of the mainframe of the optical communication module, fixing the optical communication module to the mounting board by screwing.

18. The mounting method as defined in claim 15, further comprising the step of:

welding a weld-use protrusion as fixing means provided on a lower side of a mainframe of the optical communication module to the mounting board for fixing the optical communication module to the mounting board.

19. An electronic apparatus incorporating the optical communication module as defined in claim 1.

20. An electronic apparatus incorporating an optical communication module mounted by the mounting method of an optical communication module as defined in claim 15.

* * * * *